US006684560B2

(12) United States Patent
Lafforthun (10) Patent No.: US 6,684,560 B2
(45) Date of Patent: Feb. 3, 2004

(54) HUMANE ANIMAL TRAP

(76) Inventor: David Lafforthun, P.O. Box 174, Galway, NY (US) 12074

( * ) Notice: Subject to any disclaimer, the term of this patent is extended or adjusted under 35 U.S.C. 154(b) by 132 days.

(21) Appl. No.: 09/837,605

(22) Filed: Apr. 18, 2001

(65) Prior Publication Data

US 2003/0084603 A1 May 8, 2003

(51) Int. Cl.[7] .................. A01M 23/02; A01M 23/04
(52) U.S. Cl. ........................................ 43/61; 43/67
(58) Field of Search .................... 43/60, 61, 67, 43/69, 70

(56) References Cited

U.S. PATENT DOCUMENTS

| | | | |
|---|---|---|---|
| 617,617 A | 1/1899 | Thornley | |
| 835,874 A | * 11/1906 | Thorer | 43/67 |
| 877,138 A | * 1/1908 | Stone | 43/67 |
| 882,373 A | * 3/1908 | Carter | 43/67 |
| 1,068,894 A | * 7/1913 | Griffith | 43/67 |
| 1,108,724 A | * 8/1914 | Draper et al. | 43/67 |
| 1,349,453 A | 8/1920 | Hall | |
| 1,370,084 A | * 3/1921 | Brister | 43/67 |
| 1,519,459 A | 12/1924 | Knight | |
| 1,541,639 A | * 6/1925 | Gregory | 43/67 |
| 1,726,493 A | * 8/1929 | Kelley | 43/67 |
| 1,747,380 A | 2/1930 | McCully | |
| 1,793,773 A | 2/1931 | Brown | |
| 1,862,038 A | 6/1932 | Session | |
| 1,948,601 A | 2/1934 | Thomas | 43/69 |
| 2,217,136 A | * 10/1940 | Roff | 43/67 |
| 2,225,251 A | * 12/1940 | Andrick | 43/67 |
| 2,478,605 A | 8/1949 | Symens | 43/61 |
| 2,524,504 A | 10/1950 | Woolworth | 43/61 |
| 2,541,681 A | 2/1951 | Andrews | 43/61 |
| 2,587,349 A | 2/1952 | Mace | 43/76 |
| 2,643,480 A | 6/1953 | Jones | 43/70 |
| 3,585,750 A | 6/1971 | Routt | 43/61 |
| 3,828,460 A | * 8/1974 | Herman | 43/61 |
| 3,975,857 A | 8/1976 | Branson et al. | 43/61 |
| 4,103,448 A | * 8/1978 | Souza | 43/67 |
| 4,144,667 A | 3/1979 | Souza | 43/61 |
| 4,554,758 A | * 11/1985 | Molloy | 43/61 |
| 4,557,067 A | 12/1985 | Ha | 43/61 |
| 4,583,316 A | 4/1986 | Holtgrefe | 43/61 |
| 4,603,504 A | 8/1986 | Llanos | 43/76 |
| 4,682,440 A | 7/1987 | Hunter | 43/61 |
| 4,748,766 A | 6/1988 | Stimac | 43/69 |
| 4,757,638 A | 7/1988 | Lafforthun | 43/66 |
| 5,341,592 A | 8/1994 | Lafforthun | 43/66 |
| 5,345,710 A | 9/1994 | Bitz | 43/61 |
| 5,367,820 A | 11/1994 | Lafforthun | 43/61 |
| 5,471,781 A | 12/1995 | Vine | 43/69 |
| 5,809,688 A | 9/1998 | Wallen | 43/61 |
| 5,862,624 A | 1/1999 | Askins | 43/61 |
| 5,943,813 A | 8/1999 | Wang | 43/61 |
| 5,979,105 A | 11/1999 | Marks | 43/61 |

FOREIGN PATENT DOCUMENTS

| | | | | |
|---|---|---|---|---|
| CA | 1047249 | * | 1/1979 | 43/67 |

* cited by examiner

Primary Examiner—Kurt Rowan
(74) Attorney, Agent, or Firm—Heslin Rothenburg Farley & Mesiti P.C.; John Pietrangelo (57) ABSTRACT

An animal trap for capturing small animals, such as rodents, and birds and a method for using the trap. The trap includes a chamber having side walls, an entrance, and a perforated end wall opposite the entrance; a first platform adjacent the entrance pivotally mounted to the side walls, the first platform providing a path from the entrance; a second platform located away from the entrance pivotally mounted to the side walls and having a first end extending beneath the first platform; and means for holding the first and second platforms in an essentially horizontal position; wherein when an animal passes through the entrance and contacts the second platform, the second platform pivotally deflects and pivotally deflects the second platform wherein the first platform obstructs the entrance and the animal is captured. The means for holding the two platforms in an essentially horizontal position may be a rod or bar which engages part of the trap housing. The trap may also include a third platform which is pivotally mounted to the second platform and which pivotally deflects under the weight of an animal. The third platform is adapted to disengage the bar or rod from the housing.

25 Claims, 7 Drawing Sheets fig. 1 fig. 2 fig. 3 fig. 4A fig. 4B fig. 5A fig. 5B fig. 6 fig. 7 fig. 8A fig. 8B fig. 9 fig. 10A fig. 10B

HUMANE ANIMAL TRAP

TECHNICAL FIELD

The invention relates in general to an animal trap, and more particularly to a trap which humanely captures an animal by utilizing a housing having pivotally moveable platforms which when deflected under the weight of an animal obstruct the housing entrance wherein the animal is captured within the housing.

BACKGROUND OF THE INVENTION

Animal traps exist which permit the humane capture of animals. Humane capture is especially desirable for the trapping of rodents, such as mice or rats, that may inhabit human dwellings. Numerous types of traps have been devised which effect the capture of animals without injury thereto (see, for example, U.S. Pat. Nos. 2,478,605; 2,524,504; 3,975,857; and 4,682,440). Many of these traps have intricate designs and are therefore not suitable for manufacture on a large scale.

Consequently, a need continues to exist for an animal trap which is both safe and effective in the humane capture of animals, especially rodents, as well as readily manufacturable. The present invention provides such a design having these and other advancements compared to the prior art.

SUMMARY OF THE INVENTION

The present invention provides methods and apparatus which address many of the limitations of prior art methods and apparatus. One feature of the present invention that is particularly advantageous is the presence of an opening or aperture in the wall opposite the entrance of the trap. Not only does this opening provide what appears to be a clear line of sight from the entrance through to the opening, which appears to provide an exit for an animal looking into the trap, but the opening in the wall opposite the entrance also allows air to flow from the entrance through the trap and through the opening. According to the invention, an animal standing outside the entrance or in the entrance of the trap can sense this air flow and is led to believe that an exit exists by way of the trap. Though not required, the presence of bait in a chamber adjacent the opening in the wall opposite the entrance can also be used to lure an animal into the trap. The combination of a clear line of sight, flow of air through the trap, and presence of bait can further enhance the effectiveness of the trap.

One aspect of the invention is an animal trap comprising: a chamber having a top, a bottom, side walls, an entrance, and a perforated end wall opposite the entrance; a first platform adjacent the entrance pivotally mounted to the side walls, the first platform providing a path from the entrance; a second platform distal the entrance pivotally mounted to the side walls and having a first end extending beneath the first platform; and means for holding the first and second platforms in an essentially horizontal position; wherein when an animal passes through the entrance, over the first platform, and contacts the second platform, the second platform pivotally deflects and the first end of the second platform contacts and pivotally deflects the second platform wherein the first platform obstructs the entrance and the animal is captured. In one aspect of the invention the chamber has at least one exit and the second platform includes means for obstructing the at least one exit. The means for obstructing the at least one exit preferably obstructs the exit when the second platform is in an essentially horizontal "unsprung" position. The means for holding the first and second platforms in essentially horizontal position typically comprises at least one of a spring, counterweight and magnet. In another aspect, the first platform of the trap includes a transverse barrier mounted on the first platform and the transverse barrier includes at least one aperture. Furthermore, when the first platform pivotally deflects, the at least one aperture is obstructed.

In another aspect of the invention, the trap includes a second chamber having at least one entrance, wherein the at least one entrance of the second chamber communicates with the at least one exit of the first chamber. In a preferred aspect, the second chamber is detachable from the first chamber.

Another aspect of the invention is a method for capturing one or more animals using a trap having a chamber, the chamber having a top, a bottom, side walls, an entrance, and a perforated end wall opposite the entrance; a first platform adjacent the entrance and pivotally mounted to the side walls; a second platform distal the entrance and pivotally mounted to the side walls; and positioning means for holding the first and second platforms in an essentially horizontal position, the method comprising the following steps: providing a clear line of sight from the entrance through the perforated end wall; attracting an animal to the entrance so that the animal is lured into the entrance and passes over the first platform while maintaining the clear line of sight; when the animal contacts the second platform, allowing the first platform to pivotally deflect whereby the first platform is deflected, the entrance is obstructed, and the one or more animals is captured. This method typically includes the further step, before attracting an animal, positioning the first and second platforms in an essentially horizontal position using the positioning means. The method may also be used for a chamber which includes at least one exit and for which the second platform includes a baffle plate, and further include obstructing the exit with the baffle plate. A further step of the method of the invention may include removing the obstruction from the exit when the platform is deflected to provide an egress from the chamber.

A still further aspect of this invention is an animal trap for humanely capturing and transferring small animals, comprising: a first chamber having a top, a bottom, side walls, an entrance, an exit and a perforated end wall opposite the entrance; a second chamber having a top, a bottom, side walls, and an entrance, the entrance communicating with the exit of the first chamber; a first platform adjacent the entrance of the first chamber pivotally mounted to the side walls of the first chamber, the first platform providing a path from the entrance; a second platform distal the entrance of the first chamber pivotally mounted to the side walls of the first chamber, the second platform having a first end extending beneath the first platform, a second end opposite the first end, and a baffle plate adapted to obstruct the exit of the first chamber; and means for holding the first and second platforms in an essentially horizontal position; wherein when an animal passes through the entrance of the first chamber, traverses the first platform, and contacts the second platform, the second platform pivotally deflects whereby the exit is uncovered and the first end of the second platform contacts and pivotally deflects the second platform whereby the first platform obstructs the entrance and the animal is captured. The trap according to this aspect of the invention may also have a second platform which includes a generally vertical barrier mounted on the second end of the second baffle plate, the barrier having at least one aperture.

These and other embodiments and aspects of the present invention will become more apparent upon review of the attached drawings, description, and claims.

BRIEF DESCRIPTION OF THE DRAWINGS

The subject matter which is regarded as the invention is particularly pointed out and distinctly claimed in the concluding portion of this specification. The invention, however, both as to organization and method of practice, together with further objects and advantages thereof, may best be understood by reference to the following detailed descriptions of the preferred aspects and the accompanying drawings in which:

DETAILED DESCRIPTION OF THE PREFERRED EMBODIMENTS

Figure 1:
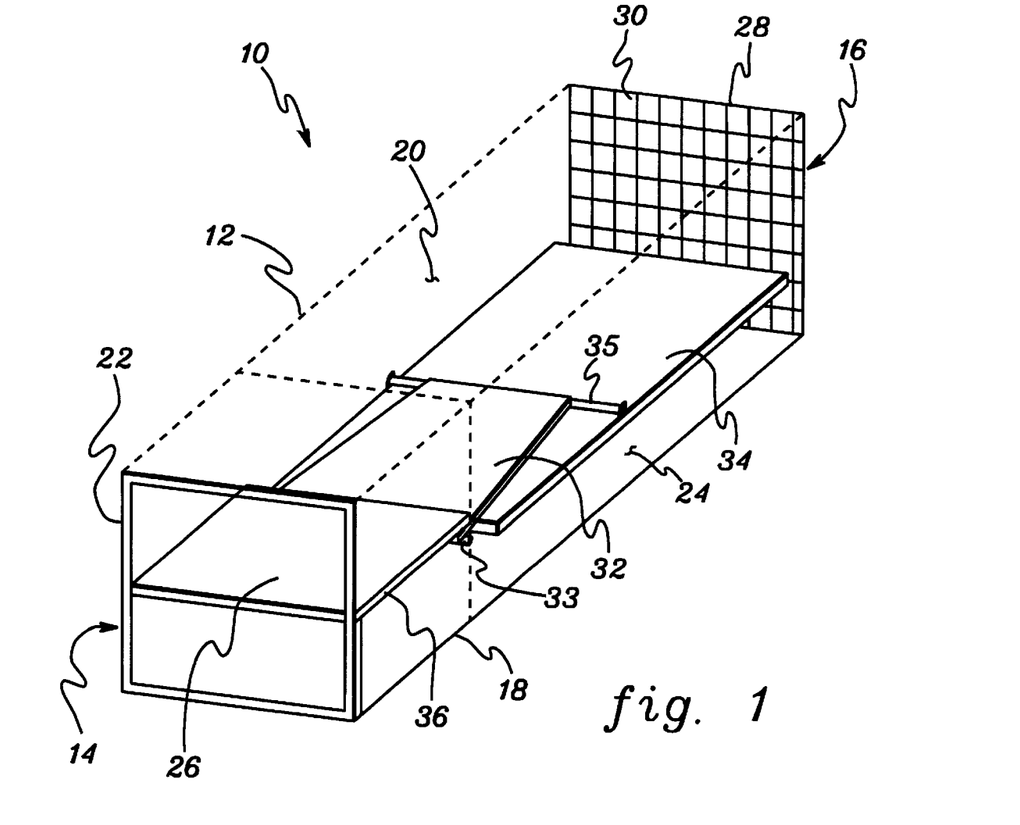
FIG. 1 illustrates an isometric view, partially in cross-section, of one aspect of the present invention.
Figure 2:
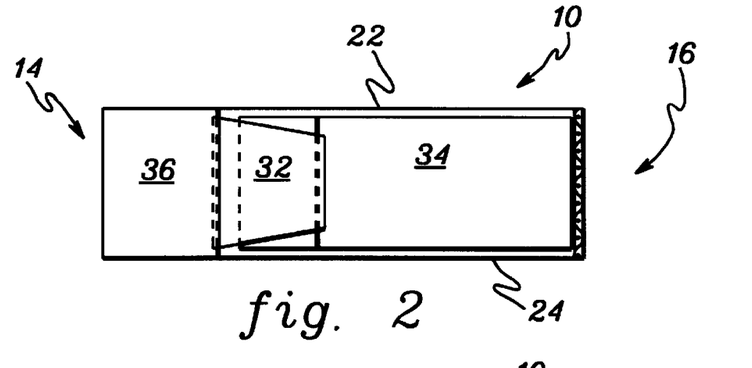
FIG. 2 illustrates a top view, partially in cross-section of the aspect shown in FIG. 1.
Figure 3:
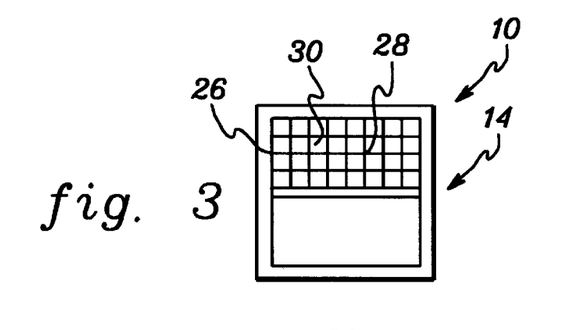
FIG. 3 illustrates an end view of the aspect shown in FIG. 1.
Figure 4A:
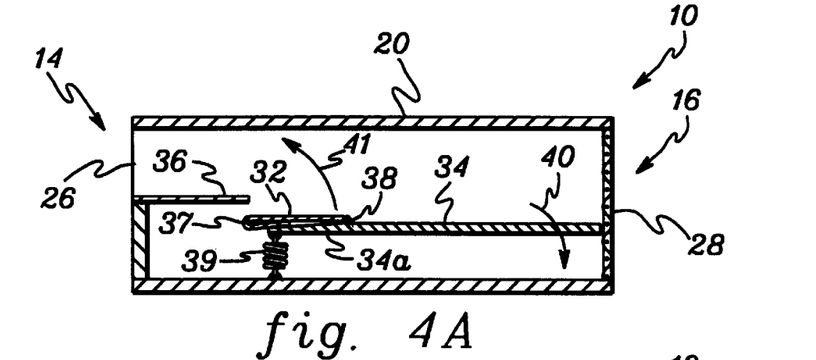
FIGS. 4A and 4B illustrate a cross-sectional, side elevation view of the aspect shown in FIG. 1.
Figure 4B:
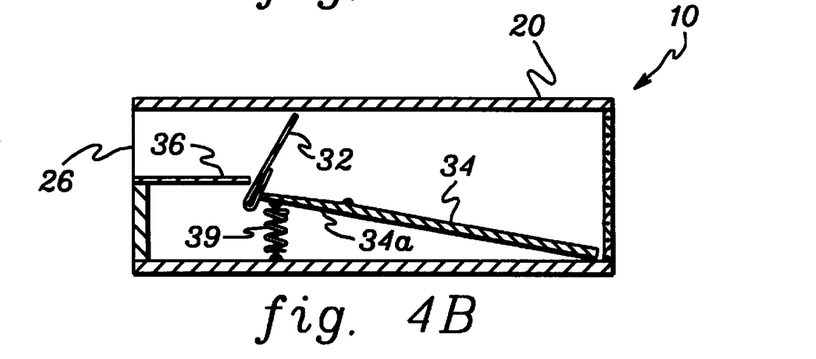

FIGS. 1, 2, 3, 4A and 4B illustrate one trap 10 according to one aspect of the present invention for capturing rodents, birds, or other small animals. FIG. 1 illustrates an isometric view partially in cross-section; FIG. 2 is a top view of the apparatus shown in FIG. 1; FIG. 3 is an end view of the apparatus shown in FIG. 1; and FIGS. 4A and 4B are cross-sectional side-elevation views of the apparatus shown in FIG. 1. The apparatus shown includes a generally elongated, rectangular housing or chamber 12 having a first end 14 and a second end 16, a base 18, a top 20, and two side walls 22 and 24. It will be understood by those of skill in the art that the size of the housing 12 will vary depending upon the size of the animal intended to be captured. However, regardless of the size of the housing 12, the operation and relative relationships of the parts of this trap 10 of the present invention are generally the same. The housing 12 includes an entrance 26 at the first end 14 through which one or more animals pass and an end wall 28 at the second end 16. According to the invention, the end wall 28 includes one or more apertures or perforations 30 which when viewed from the entrance 26 provide a clear line of sight from the entrance 26 through the end wall 28. This clear line of sight of the invention is generally shown in FIG. 3 which shows an end view from the entrance 26 in the first end 14. Though apertures or perforations 30 provide a clear line of sight from the entrance 26, according to this aspect of the invention, the aperture or perforations 30 are small enough to prevent the passage of the desired animal to be trapped. The apertures or perforations 30 may be one or more apertures or perforations. For example, the apertures 30 may be a single aperture of limited size to prevent escape of the animal to be captured. The apertures 30 may preferably be a plurality of apertures, for example, 2 or more holes, or a wire mesh or screen, for example, a metal wire mesh or screen having many small holes, apertures, or openings that provide a clear line of sight through the apertures 30, but prevent the passage of animals.

The housing 12 according to this aspect of the invention also includes a first moveable platform 32 and a second moveable platform 34 which are pivotably mounted to side walls 22 and 24. The present invention also includes an essentially stationary or third platform 36 which is essentially rigidly mounted to side walls 22 and 24. Stationary platform 36 may be omitted if desired. Platforms 32, 34, and 36 according to the invention have essentially the same width as the inside width dimension of housing 12. The lengths of platforms 32, 34 and 36 are a function of the height of housing 12; this relationship will become more apparent from the discussion of the operation of apparatus 10 that appears below. Platforms 32 and 34 may be mounted to side walls 22 and 24 by any conventional means that ensures the platforms 32 and 34 can each pivot about an axis perpendicular to the direction of elongation of the housing. The platforms 32, 34 may be mounted on a pin or axle 33, 35, respectively, that traverses the housing 12 and engages sidewalls 22, 24; or the platforms 32, 34 may include mounting lugs that engage fasteners that pivotably engage sidewalls 22, 24, for example, threaded fasteners, rivets, pop rivets, and the like.

As shown most clearly in FIGS. 4A and 4B, platform 32 is pivotably mounted on an axis defined by a point 37 and platform 34 is pivotably mounted on an axis defined by a point 38. The platforms 32, 34, and 36 are arranged in such a manner that the moveable platforms 32, 34 will not deflect until a load is placed on platform 34 at a point beyond point 38 relative to entrance 26. That is, the trap 10 will not "spring" until a rodent, for example, passes over platforms 36 and 32 and the forward section 34a of platform 32 nearest the entrance 26. Platforms 32 and 34 are biased into a relatively horizontal orientation by a means 39, for example, a spring, counter-weight, magnet, or other means. When a load is placed on platform 32 beyond the point 38, the load pivotably deflects platform 34 in a clockwise direction (as viewed in FIG. 4A and shown by arrow 40) whereby the end 34a of platform 34 beneath platform 32 impinges upon and rotatably deflects platform 32 in a counter-clockwise direction (as shown by arrow 41 in FIG. 4A). According to the invention, platform 32 rotatably deflects whereby platform 34 impacts the lower surface of top 20, as shown in FIG. 4B, and effectively obstructs the entrance 26. Platform 32 is held in this deflected position by the weight of the animal on platform 34. Since, in this aspect of the invention, the entrance 26 provides the only means of escape from housing 12, the deflection of platform 32 and the obstruction of entrance 26 effectively traps the animal inside the housing 12. When the animal is removed from platform 34, the means 39 returns platforms 32, 34 to a relatively horizontal position, for example, to await the arrival of another rodent.

Figure 5A:
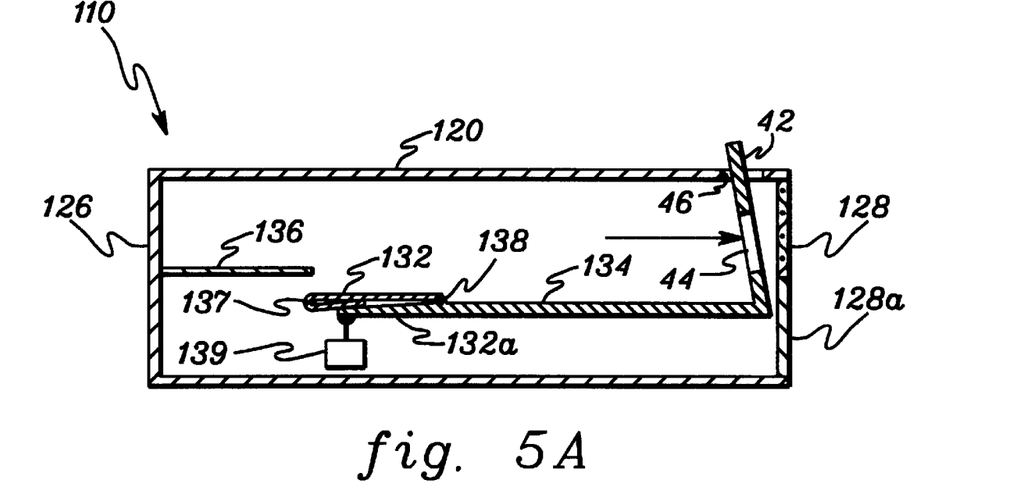
FIGS. 5A and 5B illustrate an alterative aspect of the invention shown in FIGS. 4A and 4B.
Figure 5B:
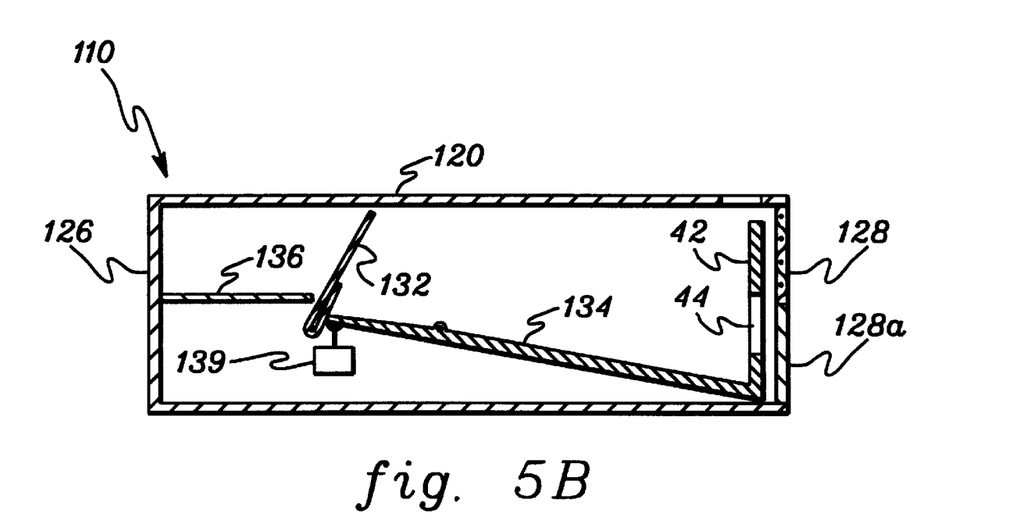

FIGS. 5A and 5B illustrate another trap 110 according to another aspect of the invention that is an alternative to the invention shown in FIGS. 4A and 4B. Similar to the aspect illustrated in FIGS. 4A and 4B, the trap 110 illustrated in FIGS. 5A and 5B includes moveable platforms 132, 134, pivotably mounted at 137 and 138, respectively, and stationary platform 136 adjacent entrance 126. Trap 110 also includes a top 120 and a perforated end wall 128. In this aspect, the platform 134 includes a barrier 42 having at least one aperture 44. Barrier 42 is generally oriented in a vertical direction with respect to platform 134. As will be evident from the discussion of the movement of platform 134 below, barrier 42 may be canted slightly (for example, between about 5 and 20 degrees) toward entrance 26 so that barrier 42 assumes a generally vertical orientation when platform 134 is in the deflected position. Barrier 42 may extend through an aperture 46 in top 120. In addition, according to this aspect of the invention, only a portion of the end wall 128 may be perforated. For example, the lower portion 128a of end wall 128 can be a solid, unperforated wall. Thus, according to the present invention, as shown in FIG. 5A, before platform 134 is deflected, a clear line of sight is provided from the entrance 126, through aperture 44 and through perforated end wall 128, as indicated by arrow 41. That is, a rodent entering entrance 126 views a path which appears to be an unobstructed exit path.

Platform 134 of FIG. 5A operates in the same manner as platform 34 of FIG. 3A. That is, when an animal contacts platform 134 at a location beyond point 138, platform 134 deflects in a manner similar to platform 34 and in so doing deflects platform 132, as described above, to obstruct entrance 126, as shown in FIG. 5B. However, as shown in FIG. 5B, when platform 134 is deflected, the apertured barrier 42 is also deflected and in the deflected position aperture 44 is obstructed by the unperforated end wall 128a. Of course, end wall 128a may also be perforated, that is, with holes smaller than are passable by the animal, and still effect the desired entrapment. Also, according to this aspect of the invention, the end wall 128 may comprise only a partial wall, for example, as indicated by 128a, since the deflection of platform 132 having barrier 42 will obstruct the path of escape above partial end wall 128a as shown in FIG. 5B. Platforms 132, 134 are typically returned to a horizontal position by a spring or counter-weight 139.

Figure 6:
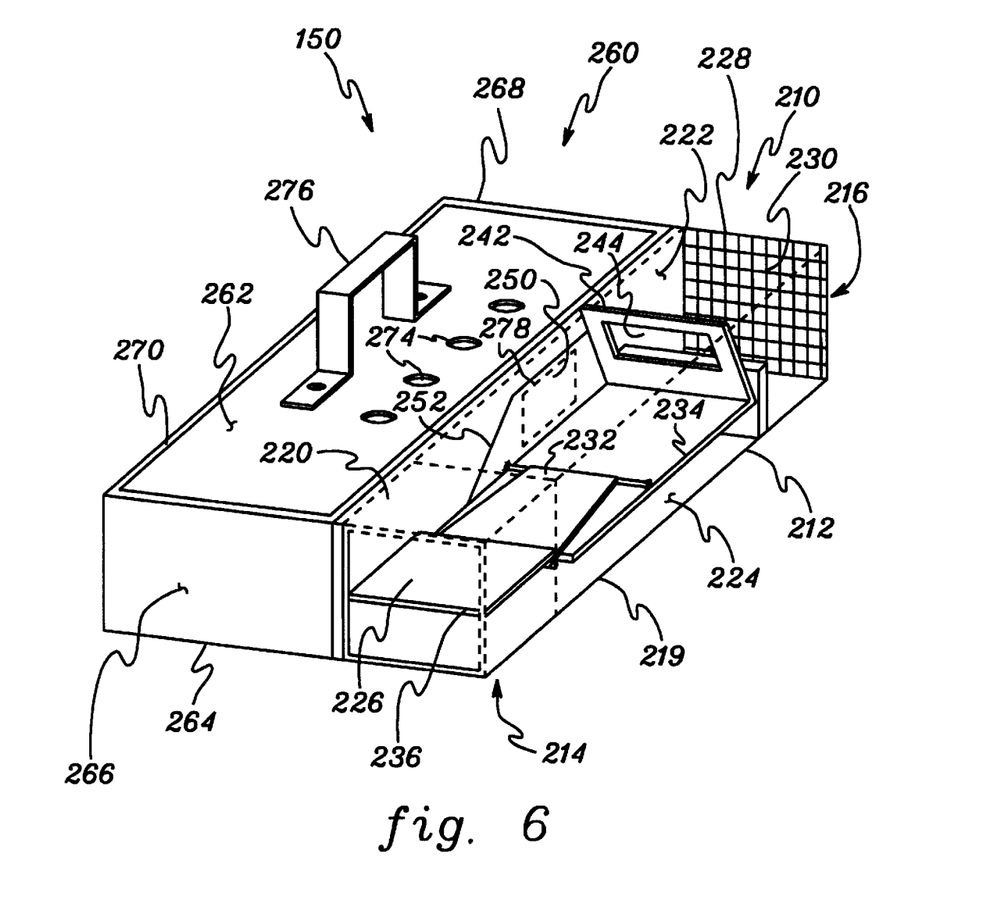
FIG. 6 illustrates an isometric view, partially in cross-section, of another aspect of the present invention.

FIG. 6 illustrates another trap 150 according another aspect of the present invention. Trap 150 includes a first chamber 210 which is similar to or identical to the trap 10 shown in FIGS. 1, 2, 3, 4A, and 4B. However, the trap 150 shown in FIG. 6 also includes as second chamber 260 which is used to hold one or more animals captured by the trap mechanism of chamber 210.

Again, chamber 210 may be similar to chamber 10 of FIG. 1 and have a housing 212 having first end 214, a second end 216, a bottom 219, a top 220, and side walls 222 and 224. Chamber 210 includes an inlet 226 through which animals enter the trap 150. Also, chamber 210 includes pivotably moveable platforms 232, 234, and a stationary platform 236. Platforms 232 and 234, deflect under load in a fashion essentially identical to platforms 32 and 34 of FIGS. 1, 2, 3, 4A and 4B and platforms 132 and 134 of FIGS. 5A and 5B. Platform 234 may also include a generally vertical barrier 242 having an aperture 244 similar to barrier 42 and aperture 44 of FIGS. 5A and 5B, but barrier 242 may also be omitted. Chamber 210 may also include an end wall 228 at end 216 having at least one perforation 230. As before, at least one perforation 230 is typically a plurality of perforations, for example, end wall 228 may be a steel wire screen. Chamber 210 also includes an intermediate barrier or wall 245 positioned between the end of platform 234 and end wall 228. According to this aspect of the invention, unlike end wall 228, barrier 245 does not extend to the top of chamber 210, but has a height less than the height of chamber 210. Though barrier 245 provides other functions as described below, barrier 245 and end wall 228 define a "bait chamber" for trap 150 for holding bait, for example, cheese, to lure the rodent into trap 150.

Chamber 210 differs from earlier chambers in that chamber 210 includes at least one aperture or exit 250 (shown in phantom) in side wall 222. Aperture 250 is aligned with at least one aperture or entrance (not shown for clarity of illustration) in chamber 260 so that an animal in chamber 210 can pass to chamber 260. Chamber 210 also includes a means for holding and returning platform 232 and 234 to a horizontal position when unloaded, for example, a spring or counterweight (not shown). According to this aspect of the invention, platform 234 includes a baffle plate 252 which, when platform 234 is in the undeflected, horizontal position, obstructs aperture 250. Baffle plate 252 may assume any desired shape which at least partially obstructs, preferably totally obstructs, aperture 250. Baffle plate 252 may be attached to barrier 242 at a common interface. When platform 232 is deflected, for example, under the weight of a mouse, the aperture 250 is at least partially exposed.

Chamber 260 of trap 150 is a holding compartment for the animals trapped by chamber 210. Chamber 260 comprises a generally rectangular box having a top 262, a bottom 264, a front wall 266, a back wall 268, and side walls, 270 and 272. In one aspect of the invention, side wall 272 may be the same wall as side wall 222 of chamber 210. Top 262, front wall 266, back wall 268, and side walls 270, 272, may include at least one aperture 274 for allowing air to access chamber 260 for the animal or animals enclosed. Top 262, front wall 266, back wall 268, and side wall 270 may include at least one handle 276 for removing and transporting chamber 260. According to the present invention side wall 272 of chamber 260 includes at least one aperture or entrance 278 (shown in phantom) which is at least somewhat aligned with aperture 250 in side wall 222 of chamber 210. Thus, according to this aspect of the invention, when platform 234 in chamber 210 is deflected under the weight of a rodent, for example, and the entrance 226 is obstructed by platform 232, the baffle plate 252 is also deflected and aperture 250 is at least partially exposed. Having no other means of egress, the rodent will typically exit chamber 210 via aperture 250 and enter chamber 260 via aperture 278. Chamber 260 also typically includes a removable cover plate (not shown) for aperture 278 whereby after one or more animals enter chamber 260, the removable cover plate can be installed to cover aperture 278. Chamber 260 with one or more animals enclosed can then be removed from chamber 210 and released, for example, in an uninhabited area or an area insensitive to the presence of captured animal, without allowing the animals inside chamber 260 to escape.

Chamber 260 may be rigidly attached to chamber 210, for example, integrally attached by means of welding or mechanical fasteners. However, in a preferred aspect of the invention, chamber 260 is readily detachable from chamber 210. For example, in one aspect of the invention shown in FIG. 7, chamber 210 includes a receptacle 280 having a bottom 282 and at least two sides 284 (one of which may be common with side 222 of chamber 210) into which chamber 210 can be slidably inserted. Receptacle 280 may be further defined by at least two projections 286 which, along with sides 284 and bottom 282, retain chamber 260. According to this aspect of the invention, receptacle 280 retains chamber 260 such that wall 272 of chamber 260 abuts wall 222 of chamber 210 and the aperture 278 of chamber 260 is at least somewhat aligned with aperture 250 of chamber 210. Receptacle 280 may also comprise at least three side walls 284, typically four side walls 284, whereby chamber 260 can be inserted and removed without the need for projections 286. Other means of inserting into, retaining, and removing chamber 260 from receptacle 280 will be apparent to those of skill in the art.

Figure 8A:
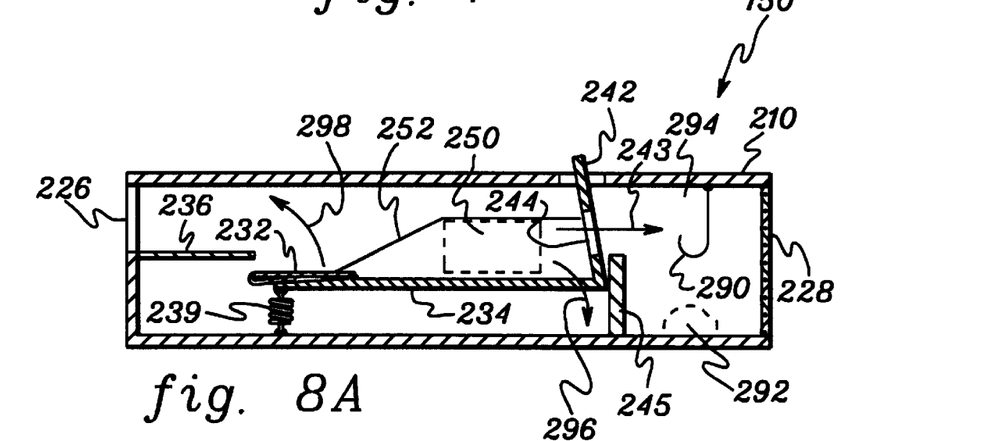
FIGS. 8A and 8B illustrate a cross-sectional, side elevation views of the aspect shown in FIG. 6.
Figure 8B:
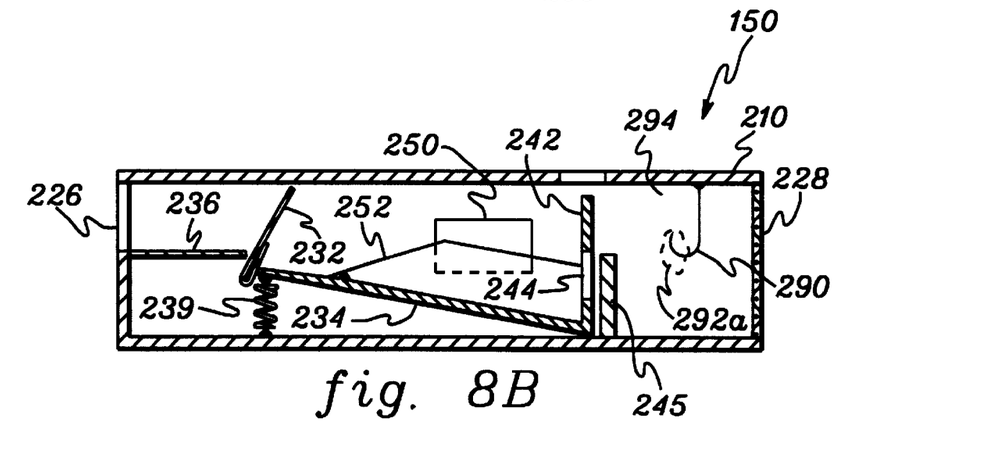

FIGS. 8A and 8B illustrate side elevation views of chamber 210 of trap 150 shown in FIG. 6. The features described with respect to FIG. 6 are essentially identical to those described in FIGS. 8A and 8B and are assigned the same reference numbers. However, two features of the aspect shown in FIGS. 8A and 8B that were not disclosed earlier are the optional bait hook 290 and bait 292, for instance, for hanging or inserting grain-product-type bait, for example, peanut butter, or meat-product-type bait, for example, cooked meat. Bait 292 is located beyond the vertical wall 245, in what is referred to as the "bait chamber", 294.

Trap 150 operates as follows, with reference to the aspects illustrated in FIGS. 6, 8A, and 8B. The rodent, bat, bird, or other small animal is lured into the entrance 226 of chamber 210 by means of the bait 292; the apparent exit path that appears through the view through the entrance 226, aperture 244, and perforated end wall 228 (as indicated by arrow 243); or both. As shown in FIG. 8A, the height of barrier 245 according to the invention is preferably lower than the elevation of the bottom edge of aperture 244 to maintain the clear line of sight from the inlet 226 to the perforated end wall 228. In the undeflected position, platforms 232 and 234 are held in an essentially horizontal position by means 239, for example, a spring, as shown in FIG. 8A. In addition, when the platforms 232, 234 are in the horizontal position, that is, the trap is not "sprung", aperture 250 is obstructed by baffle 252. When the animal passes over platforms 236 and 232 and alights on platform 234, the weight of the animal deflects platform 234 in the direction shown by arrow 296. When platform 234 deflects, platform 234 impacts and deflects platform 232 as shown by arrow 298 in FIG. 8A. As a result, platforms 232 and 234 deflect to their respective positions shown in FIG. 8B, the entrance 226 is obstructed by platform 232 and the aperture 250 in side wall 222 of chamber 210 is at least partially exposed. Furthermore, with the deflection of platform 232, vertical wall 242 deflects and obstructs passage to the bait chamber 294. Therefore, the only means of egress provided for the animal trapped in chamber 210 is the aperture 250. With no other means of egress, the animal will then pass through aperture 250 and the adjoining aperture 278 in the side wall 272 of chamber 260 and thus enter and be retained in chamber 260. In addition, in another feature of this aspect of the invention, when the animal exits chamber 210, the load on platform 234 is removed and the platforms 232 and 234 are returned to their undeflected, essentially horizontal position by means 239 (again, a spring, counterweight, or other means) and trap 150 is "set" for catching additional animals.

Figure 7:
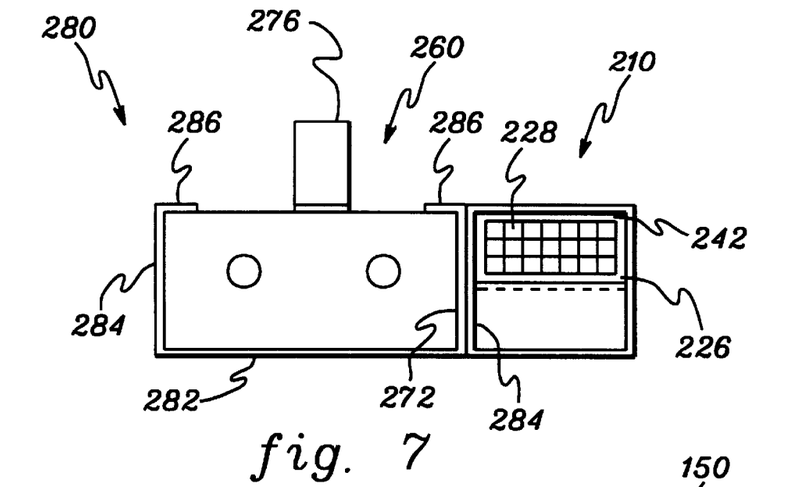
FIG. 7 illustrates and end view of another aspect of the present invention shown in FIG. 6.

The animal in chamber 260 can be removed by detaching chamber 260 from chamber 210, for example, by means of handle 276 (see FIG. 7). Chamber 260 can also be left attached to chamber 210 in hopes of catching further animals before removing chamber 260.

Figure 9:
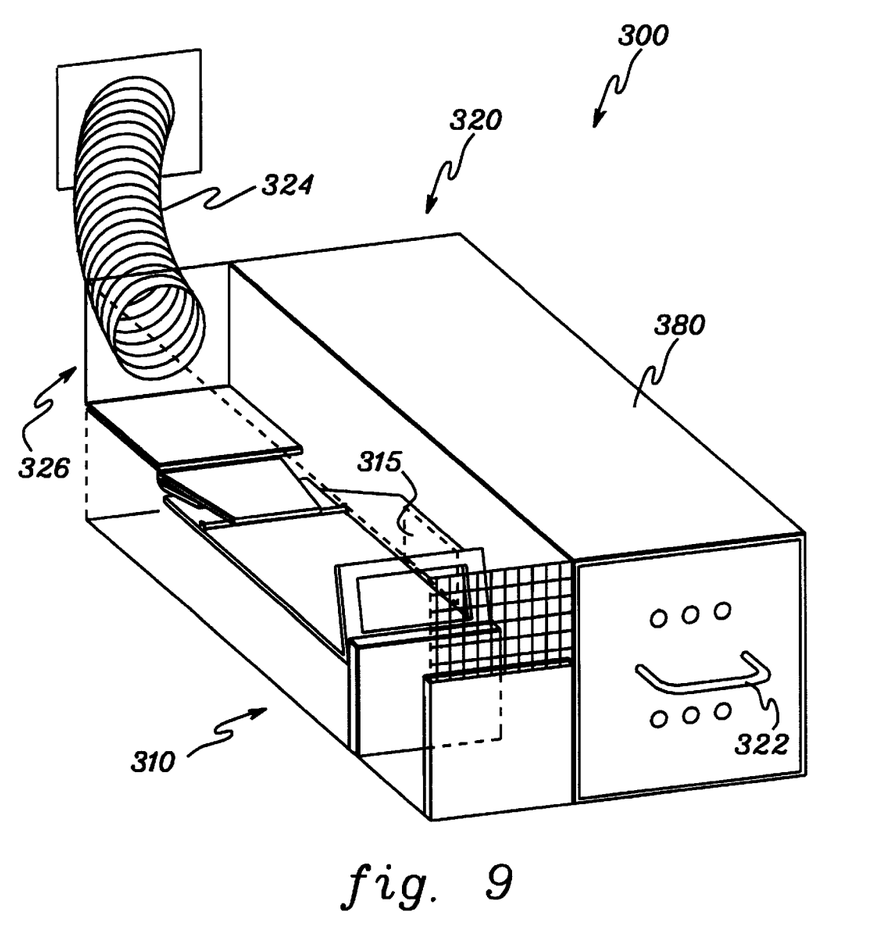
FIG. 9 illustrates an isometric view, partially in cross-section, of another aspect of the present invention.

FIG. 9 illustrates another animal trap 300 according to a further aspect of the present invention. Trap 300 is similar in design and function to trap 150 shown in FIG. 6. For example, trap 300 includes a first chamber 310 similar to chamber 210 of FIG. 6 and a second chamber 320 similar to chamber 260 of FIG. 6. Chamber 310 contains moveable platforms similar to platforms 32 and 34, 132 and 134, and 232 and 234; an entrance 326; and an aperture 315 (shown in phantom) that passes from chamber 310 to chamber 320 by means of a corresponding aperture in the side wall of chamber 320 as described earlier. In the aspect shown in FIG. 9, chamber 320 slidably engages a receptacle 380 which retains chamber 320. Chamber 320 may include a handle 322 for removing chamber 320 from receptacle 380.

FIG. 9 also includes a flexible conduit, pipe, or hose 324 attached to inlet 326. Conduit 324 can be used to lead a small animal, for example, a rodent, a flying squirrel, or a bat, into the entrance 326 of chamber 310. One such conduit is disclosed in U.S. Pat. Nos. 4,757,638 and 5,341,592, the disclosures of which are incorporated by reference herein in their entirely. Typically one end of conduit 324 is attached to a structure in the vicinity of where the undesirable animal exits the structure, for example, one end of conduit 324 can be attached to an opening or crack under the eaves of a house where bats are known to exit at dusk. The other end of the conduit 324 is attached to entrance 326 of chamber 310. Conduit 324 acts as passage for the animal from the structure to the trap 300. When the animal enters entrance 326 and alights on the platforms, the platforms deflect and the aperture 315 is exposed as described with respect to the earlier embodiments. Again, one or more animals can be captured and retained in chamber 320 and, when necessary, removed and transferred by means of handle 322, The use of conduit 324 for leading an animal to the entrance of a trap is not limited to the aspect of the invention disclosed in FIG. 9. A flexible hose or conduit 324 of appropriate length and diameter may be used to lead one or more small animals to the entrances of any or all of the traps disclosed in this specification, including the traps shown in FIGS. 1 and 6.

Figure 10A:
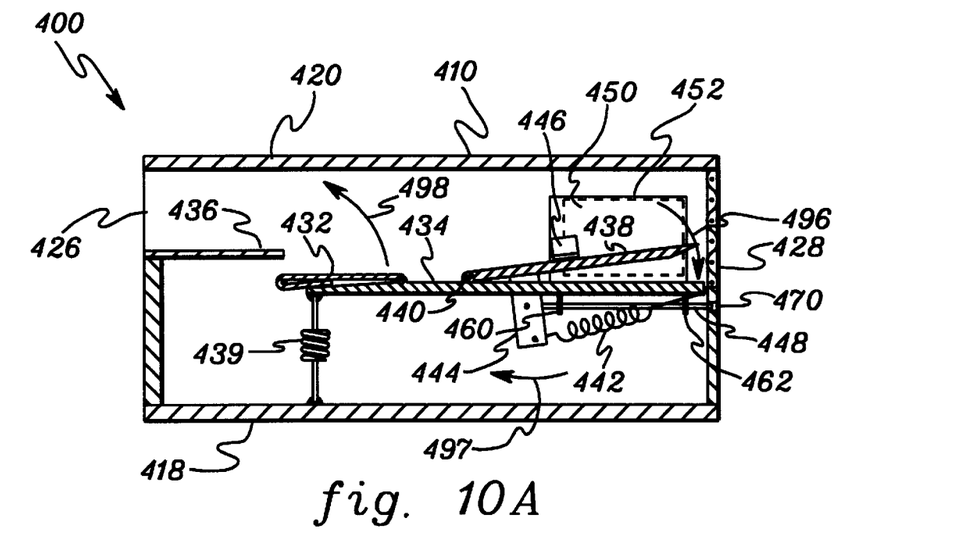
FIGS. 10A and 10B illustrate another aspect of the present invention.
Figure 10B:
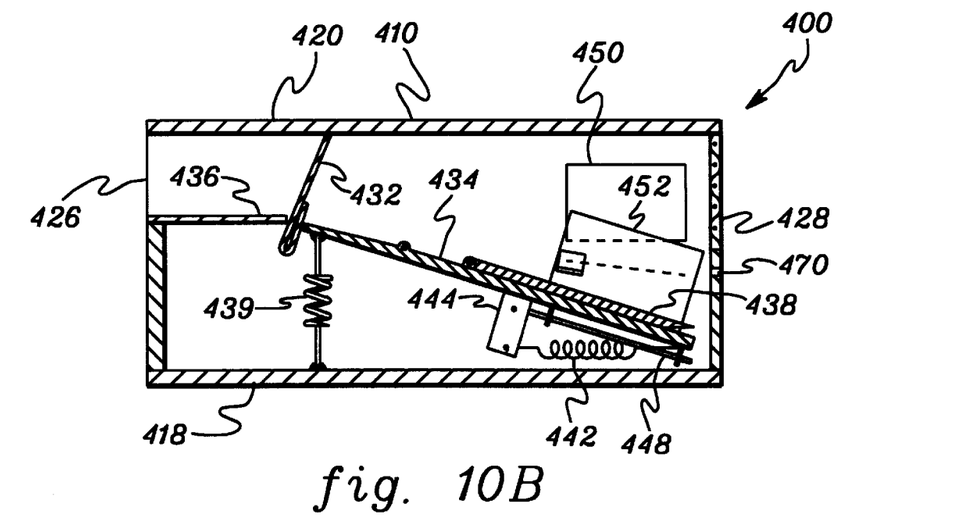

FIGS. 10A and 10B illustrates a further embodiment of the present invention. In the aspects of the invention shown in FIGS. 6 through 10 having second chamber 260, for example, for holding one or more animals, there is very little deterrent for animals, especially larger animals such as squirrels or skunks, to re-enter the first chamber 210 by deflecting the barrier 252, for example, from within chamber 260. Larger animals could paw barrier 252 and exert enough force to overcome counter-weight or spring 239 and deflect platform 234 and undesirably regain access to chamber 210. The aspect of the invention shown in FIGS. 10A and 10B addresses this undesirable feature of the earlier aspects of the present invention and provides a mechanism which prevents animals from re-entering chamber 210 from chamber 260, for example.

FIGS. 10A and 10B illustrate a cross-sectional view of one aspect 400 of the present invention which prevents animals from exiting the holding chamber, for example, chamber 260 of FIG. 7, and re-entering, for example, chamber 210. FIGS. 10A and 10B are cross-sectional views of chamber 410 much like the views shown in FIGS. 8A and 8B. For example, FIG. 10A includes an entrance 426, a stationary platform 436 adjacent the entrance 426 and two pivotally mounted platforms 432 and 434, similar in design and operation to platforms 32, 34, and 36; platforms 132, 134, and 136; and platforms 232, 234, and 236 discussed above. Chamber 410 also includes a top 420, a bottom 418, an end wall 428, a return spring or counter-weight 439 attached to platform 434, and platform 434 also includes a baffle plate 452 which obstructs aperture 450 (shown in phantom) when trap 410 is in the unsprung position.

According to this aspect of the invention, chamber 410 also includes a fourth platform 438 which is pivotally mounted to platform 434 at 440. The pivotal mounting to platform 434 is essentially the same as the pivotal mountings described earlier. Platform 438 also includes some form of biasing means, for example, a spring 442 attached to a bracket 444 which is mounted to the bottom of platform 438.

Bracket 444 passes through an aperture (not shown) in platform 434. Though spring 442 is shown attached to platform 434, spring 442 may also be attached at any appropriate location on housing 410. The force exerted by spring 442 biases the orientation of platform 438 away from contact with platform 434 as shown in FIG. 1 QA. The biasing movement of platform 438 may be limited by a rod or plate which obstructs the movement of platform 438, for example, the plate 444 mounted on baffle plate 452.

According to this aspect of the invention, platform 438 is also adapted to deflect a rod or bar 448. Rod or bar 448 is attached to bracket 444 and is slidably supported by one or more brackets 460, 462 mounted on the bottom of platform 434. Rod or bar 448 also engages end wall 428 by means of an aperture or ledge 470 in end wall 428. This engagement of rod or bar 448 with end wall 428 prevents platforms 432 and 434 from being deflected and exposing aperture 450 unless platform 438 is deflected. As a result, the mechanism shown in FIG. 10A prevents an animal from deflecting barrier 452 from within chamber 260 (see FIG. 7) and accessing chamber 410.

The operation of trap 410 is illustrated with the aid of FIG. 10B where the trap is shown in its "sprung" position. Referring back to FIG. 10A, when an animal enters entrance 426 and passes over platforms 436 and 432 and the front of platform 434 and contacts platform 438, the weight of the animal overcomes the resistance of spring 442 and platform 438 deflects in the direction indicated by arrow 496. The deflection of platform 438 also deflects bracket 444 in the direction of arrow 497. The deflection of bracket 444 also deflects rod 448 whereby rod 448 disengages aperture or ledge 470 in end wall 428 allowing platform 434 to deflect and platform 432 to deflect in the direction shown by arrow 498. The deflection of platforms 432, 434 is limited by either impact of platform 432 upon the top 420 of chamber 410, as shown in FIG. 10B, or impact of platform 434 upon the bottom 418 of chamber 410. The resulting orientation of the platforms is shown in FIG. 10B. As is typical of the present invention, FIG. 10B illustrates how platform 432 obstructs entrance 426 and barrier 452 is at least partially removed from aperture 450 providing the animal only one escape path through aperture 450 to, for example, chamber 260.

According to this aspect of the invention, when the animal exits chamber 410 via aperture 450 and thus removes the load on platforms 434 and 438, counter-weight or spring 439 returns platform 434 to a relatively horizontal position. At essentially the same time, spring 442 deflects bracket 444 and thus re-positions platform 438 while deflecting rod 448 whereby rod 448 re-engages aperture or ledge 470 in end wall 428. As a result, barrier 452 of platform 434 again obstructs aperture 450 and barrier 452 is prevented from deflecting and exposing aperture 450 without the presence of an animal on platform 438. The potential for an animal re-entering chamber 410 from chamber 260 via aperture 452 is thus minimized or prevented.

The present invention provides a method and apparatus for humanely capturing undesirable rodents, birds, and other small animals so that they can be removed for example, from inhabited areas to uninhabited areas, without harming the animals. The present invention is simple in design and relatively easy to manufacture compared to prior art devices.

While the invention has been particularly shown and described with reference to preferred aspects, it will be understood by those skilled in the art that various changes in form and details may be made to the invention without departing from the spirit and scope of the invention described in the following claims.

What is claimed is:

1. An animal trap, comprising:
   a chamber having a top, a bottom, side walls, an entrance, and a perforated end wall opposite the entrance;
   a first platform adjacent the entrance pivotally mounted to the side walls, the first platform providing a path from the entrance;
   a second platform distal the entrance pivotally mounted to the side walls, the second platform having a first end extending beneath the first platform;
   a third platform rigidly mounted to the side walls adjacent the entrance, the third platform providing a path from the entrance and
   biasing means for holding the first and second platforms in a substantially horizontal position, the biasing means attached adjacent the first end of the second platform;
   wherein when an animal passes through the entrance, passes over the third platform and the first platform, and contacts the second platform, the second platform pivotally deflects and the first end of the second platform pivotally deflects the first platform wherein the first platform obstructs the entrance.

2. The trap as recited in claim 1, wherein the chamber further includes at least one exit.

3. The trap as recited in claim 2, wherein the second platform includes means for obstructing the at least one exit.

4. The trap as recited in claim 3, wherein the means for obstructing the at least one exit obstructs the at least one exit when the second platform is in a substantially horizontal position.

5. The trap as recited in claim 4 wherein the means for obstructing the at least one exit removes the obstruction when the first platform deflects.

6. The trap as recited in claim 1, wherein the second platform includes a transverse barrier mounted on the second platform.

7. The trap as recited in claim 6, wherein the transverse barrier includes at least one aperture.

8. The trap as recited in claim 7, wherein when the first platform pivotally deflects, the at least one aperture in the transverse barrier is obstructed.

9. The trap as recited in claim 1, wherein the first platform and the second platform are substantially horizontal when unloaded.

10. The trap as recited in claim 2, further comprising a second chamber having at least one entrance, wherein the at least one entrance of the second chamber communicates with the at least one exit of the first chamber.

11. The trap as recited in claim 10, wherein the second chamber is detachable from the first chamber.

12. The trap as recited in claim 11, wherein the second chamber includes means for obstructing the at least one entrance.

13. The trap as recited in claim 1, wherein the biasing means comprises at least one of a spring, counter-weight and magnet.

14. The animal trap as recited in claim 1, wherein the biasing means further comprises a rod mounted on the second platform that engages one of the side walls and end wall.

15. The animal trap as recited in claim 14, further comprising a fourth platform, pivotably mounted to the second platform, wherein the fourth platform is adapted to deflect the rod when the fourth platform is pivotably deflected whereby the rod disengages one of the side walls and end wall.

16. The animal trap as recited in claim 15, wherein the fourth platform further includes biasing means for biasing the position of the fourth platform.

17. The animal trap as recited in claim 16 wherein the biasing means for biasing the position of the fourth platform is at least one spring.

18. The trap as recited in claim 6, wherein the second platform comprises a second end, opposite the first end, and wherein the transverse barrier is mounted adjacent the second end of the second platform.

19. The trap as recited in claim 1, wherein the biasing means further comprises means for returning the first and second platforms to a substantially horizontal position after deflection.

20. The trap as recited in claim 2, wherein the at least one exit comprises an aperture in one of the top, the bottom, and the side walls of the chamber.

21. A method for capturing one or more animals using a trap having a chamber, the chamber having a top, a bottom, side walls, an entrance, and a perforated end wall opposite the entrance; a first platform adjacent the entrance and pivotally mounted to the side walls; a second platform distal the entrance and pivotally mounted to the side walls; a third platform rigidly mounted to the side walls adjacent the entrance, the third platform providing a path from the entrance; and biasing means for holding the first and second platforms in a substantially horizontal position, the biasing means attached adjacent the first end of the second platform, the method comprising:

provi­ding a clear line of sight from the entrance through the perforated end wall;

attracting an animal to the entrance so that the animal is lured into the entrance and passes over the third platform and the first platform while maintaining the clear line of sight; and when the animal contacts the second platform, allowing the second platform to pivotally deflect whereby the first platform is deflected, the entrance is obstructed, and the one or more animals are captured.

22. The method as recited in claim 21 further comprising, before attracting an animal, positioning the first and second platforms in a substantially horizontal position using the biasing means.

23. The method as recited in claim 21, wherein the chamber includes at least one exit and the second platform includes a baffle plate mounted on the second platform, the method further comprising, obstructing the at least one exit with the baffle plate.

24. The method as recited in claim 23, further comprising removing the obstruction from the exit when the platform is deflected to provide an egress from the chamber.

25. The method as recited in claim 21 wherein providing a clear line of sight from the entrance through the perforated end wall comprises providing an unobstructed, clear line of sight from the entrance through the perforated end wall.

\* \* \* \* \*